(12) United States Patent
de Paiva Cortes et al.

(10) Patent No.: US 9,234,127 B2
(45) Date of Patent: Jan. 12, 2016

(54) ANGULAR ABRASIVE PROPPANT, PROCESS FOR THE PREPARATION THEREOF AND PROCESS FOR HYDRAULIC FRACTURING OF OIL AND GAS WELLS

(75) Inventors: Gabriel Warwick Kerr de Paiva Cortes, Pocos de Caldas (BR); Guilherme de Paiva Cortes, Pocos de Caldas (BR)

(73) Assignee: Mineracao Curimbaba Ltda., Pocos de Caldas, MG (BR)

( * ) Notice: Subject to any disclaimer, the term of this patent is extended or adjusted under 35 U.S.C. 154(b) by 0 days.

(21) Appl. No.: 12/047,019

(22) Filed: Mar. 12, 2008

(65) Prior Publication Data
US 2009/0227480 A1  Sep. 10, 2009

(30) Foreign Application Priority Data
Mar. 10, 2008 (BR) .................................. 0800374-2

(51) Int. Cl.
| | | |
|---|---|---|
| *C23F 11/18* | (2006.01) | |
| *E21B 43/26* | (2006.01) | |
| *E21B 43/267* | (2006.01) | |
| *E21B 43/16* | (2006.01) | |
| *C09K 8/80* | (2006.01) | |

(52) U.S. Cl.
CPC ........................................ *C09K 8/80* (2013.01)

(58) Field of Classification Search
CPC ....... C09K 8/62; C09K 8/665; Y10S 507/906
USPC ................... 507/271, 924; 166/280, 307, 308
See application file for complete search history.

(56) References Cited

U.S. PATENT DOCUMENTS

| | | | |
|---|---|---|---|
| 3,497,008 A * | 2/1970 | Graham et al. ............ | 166/280.1 |
| 4,068,718 A * | 1/1978 | Cooke et al. ............... | 166/280.2 |
| 4,427,068 A * | 1/1984 | Fitzgibbon ................. | 166/280.2 |
| 4,518,039 A | 5/1985 | Graham et al. | |
| 4,597,991 A | 7/1986 | Graham et al. | |
| 4,732,920 A | 3/1988 | Graham et al. | |
| 4,796,670 A * | 1/1989 | Russell et al. ................ | 138/110 |
| 5,916,933 A | 6/1999 | Johnson et al. | |
| 6,059,034 A | 5/2000 | Rickards et al. | |
| 6,776,235 B1 * | 8/2004 | England ........................ | 166/271 |
| 7,270,879 B2 | 9/2007 | McCrary | |
| 7,387,752 B2 | 6/2008 | Canova et al. | |
| 2006/0219600 A1 | 10/2006 | Palamara et al. | |
| 2007/0084602 A1 | 4/2007 | Curimbaba et al. | |
| 2008/0280787 A1 | 11/2008 | Rediger et al. | |

FOREIGN PATENT DOCUMENTS

| | | |
|---|---|---|
| BR | PI9700995-4 | 12/1998 |
| WO | WO 2004097171 A1 * | 11/2004 |

OTHER PUBLICATIONS

Technical data sheet of SinterBLast of Sintex, Oct. 2007.*

* cited by examiner

*Primary Examiner* — Aiqun Li
(74) *Attorney, Agent, or Firm* — Alston & Bird LLP

(57) ABSTRACT

An angular abrasive proppant comprises angular sintered particles of a material selected from bauxite, clay-minerals, and mixtures thereof, with particle sizes varying from 30 mesh to 150 mesh. A process for the production of an angular abrasive proppant comprising sintered particles of a material selected from bauxite, clay-minerals, and mixtures thereof comprises the steps of drying, grinding, pelletizing, and sintering a bauxite starting material, grinding the sintered pellets, and sizing said particles to a particle size varying from 35 to 150 mesh. A hydraulic fracturing process uses as proppant the angular abrasive proppant as the described above.

5 Claims, No Drawings

ANGULAR ABRASIVE PROPPANT, PROCESS FOR THE PREPARATION THEREOF AND PROCESS FOR HYDRAULIC FRACTURING OF OIL AND GAS WELLS

FIELD OF THE INVENTION

The present invention relates to an angular abrasive proppant for use in processes of hydraulic fracturing of oil and gas wells.

BACKGROUND OF THE INVENTION

Oil wells are formed by deposits of oil or gases, or of a mixture of oil and gas, of solid residues and water, enclosed in rock, sand or clay formations, hereinafter referred to as "formations", whether consolidated or not, having high or low permeability. These wells may be of different levels of depth, from superficial or shallow to medium to deep wells. Once the well has been drilled and depending on the permeability of the environment, the extraction of the oil or gas begins. The oil or gas comes out of the formation, naturally or with the aid of external pressures, due to the permeability created by natural or artificial fractures in the formation until it reaches the surface, usually by means of metallic tubing ("wellbore").

Depending on the permeability, depth and on the pressures on the formation, after the well is drilled the oil or gas may not come out. On the other hand, even in high-permeability wells, from which the oil or gas comes out relatively easily, the continuous passage of the gas through pores and/or natural fractures drags solid residues and impurities which gradually block the fractures and consequently also block the oil or gas flow.

In order to solve the problem described above, techniques were developed to stimulate the wells so as to allow the oil or gas to flow properly. This stimulation technique, known as "hydraulic fracturing", consists of obtaining formation fractures by injecting fluids, usually brine. Once the fractures are formed, the same system is used, that is, the injection of fluids such as brine-based fluids containing solid particles with a wide range of mechanical strength. These particles are introduced into the fractures and when the fracturing pressures are removed, said particles present in the fractures prevent the latter from closing. The channels (fractures) obtained and filled with said particles provide a permeable means through which the oil or gas will be extracted from the well.

The aforementioned solid particles, known as "proppants" or propping agents, can be of different types, and are usually made of materials such as natural sand, resin-coated sand, spherical ceramic proppants, whether resin-coated or not, ceramic proppants for the control of the so-called flow back phenomenon, among others.

The proppants conventionally used for hydraulic fracturing are spherical ceramic proppants, such as the ones described, for example, in patent documents BR 9501449-7, BR C19501449-7 and BR 9501450-0, wherein sphericity is a requirement to obtain a fracture with maximum permeability. In the traditional hydraulic fracturing operation with natural or synthetic proppants, particle sizes predominantly vary in the range of from 8/12 to 35/70, and more predominantly in the ranges of 16/20, 16/30, 18/40 and 20/40. Minimum amounts are used outside these ranges, and all the grades are composed of spherical particles. The pelletizing processes (shaping particles into spheres) known and used to obtain these particle size ranges produce very small amounts of particles smaller than 40 mesh, do not contemplate the production of fine particles and are not able to produce them in an economically viable manner.

There are, however, applications for which the use of proppants with more abrasive characteristics than the spherical proppants currently existing and cited herein is desirable. For the particles to be more abrasive than the ones found in spherical proppants they should be angular shaped.

The conventional angular abrasive material for use in fracturing operations in oil wells is the one obtained from natural sand or natural sand-based materials, with a particle size of 100 mesh. The proppants produced with natural sand particles, however, have low mechanical strength and when used in fractures subject to significantly high confinement pressures, usually ≥4000 psi, they cannot resist and break into smaller particles, drastically reducing the permeability of the environment and increasing the flow back in the fracture stimulated with this type of proppant, with a consequent loss in productivity.

Document BR 0301036-8 defines a proppant comprising a mixture of a spherical ceramic material with an angular material for the specific purpose of controlling or preventing the flow back phenomenon, that is, the reflux of the proppant when the well goes into operation. Therefore, this is a proppant wherein the addition of angular particles in smaller proportions to a traditional spherical proppant to control, stop and obstruct the rolling motion of spherical proppants, thus preventing flow back. This proppant is produced with particles, whether angular or spherical, of up to 40 mesh in size, and contains no particle smaller than 40 mesh.

Patent document U.S. Pat. No. 6,059,034 also discloses a proppant comprising a mixture of a spherical ceramic material with a material having definite curves and an elliptic format, said angular material comprising a non-refractory, low-hardness, organic deformable polymer, which cannot stand temperatures above about 200° C.

Patent document BR 9700995-4 defines a process for the preparation of a bauxite abrasive material for use in surface finish jetting. The process described in said document comprises the steps of drying and grinding raw bauxite to a particle size smaller than 45 µm, followed by the pelletizing of the dried and ground material and subsequent sintering and grinding of the resulting sintered material to obtain angular particles with the desired characteristics for the finish jetting processes.

The aim of the present invention is to provide an angular proppant having abrasive characteristics, high mechanical strength, and which is thermally and chemically stable, in very fine fractions having high mechanical strength so that will not break easily during the fracturing of oil and gas wells.

SUMMARY OF THE INVENTION

The present invention relates to an angular abrasive proppant comprising angular sintered particles of a material selected from bauxite, clay-minerals, and mixtures thereof, with particle sizes varying from 30 mesh to 150 mesh, preferably from 40 mesh to 120 mesh.

The present invention further relates to a process for the production of an angular abrasive proppant comprising a material selected from bauxite, clay-minerals, and mixtures thereof, comprising the steps of drying, grinding, pelletizing and sintering a bauxite starting material, grinding the sintered pellets into angular particles, and sizing said particles to a particle size varying from 30 to 150 mesh, preferably from 40 mesh to 120 mesh.

The invention also relates to a hydraulic fracturing process which uses as a proppant the angular abrasive proppant as the described above.

DETAILED DESCRIPTION OF THE INVENTION

The proppant developed according to the present invention is an angular abrasive proppant made up substantially entirely or entirely of angular sintered particles of a material selected from bauxite, clay-minerals, such as kaolins or mixtures thereof, with particle sizes varying from 30 mesh to 150 mesh, preferably from 40 mesh to 120 mesh. That is, the proppant has a substantial absence of non-angular particles (e.g., spherical particles) and/or particles lying outside the 30 mesh to 150 mesh size range.

The inventors have verified that a ceramic, sintered and crushed and sized bauxite proppant material, graded to particle sizes varying from 30 mesh to 150 mesh (30/150), or preferably from 40 mesh to 120 mesh (40/120), overcomes with advantages the problems relating to the natural sand-based angular proppants known and used in the prior art. Moreover, the process for the preparation of the proppant of the present invention leads to the production of an enough fine and, angular shaped material, with enhanced abrasive characteristics, but without the inconveniences of the proppant materials already known.

The proppant of the present invention is obtained from a bauxite material whose quality is not critical and can vary widely according to the region from which it originates, in addition to clay-minerals, kaolins for example, or mixtures thereof with raw bauxite in any proportions. Bauxite is preferably used.

Bauxite is a mixture of hydrated aluminum oxides of undefined composition, containing iron, silicon, titanium, sodium and potassium accessory minerals. The main constituents of bauxite may be: gibbsite [$Al(OH)_3$], boehmite [$AlO(OH)$] and diaspore [$HAlO2$]

In general, bauxite of gibbsite origin [$Al(OH)_3$], has the following chemical composition:

| Oxide | Content (%) |
|---|---|
| $Al_2O_3$ | 52 to 64 |
| $Fe_2O_3$ | 1.0 to 20.0 |
| $TiO_2$ | 0.5 to 4.0 |
| $SiO_2$ | 0.5 to 6.0 |
| LOI | 25.0 to 32.5 |

Note:
LOI = Loss on Ignition at 900° C.

A preferred embodiment of the invention, but not limited to the claimed proppant uses bauxite with the following chemical composition:

| Oxide | Content (%) |
|---|---|
| $Al_2O_3$ | 56.0 to 60 |
| $Fe_2O_3$ | 8.0 to 11.0 |
| $TiO_2$ | 1.0 to 2.0 |
| $SiO_2$ | 0.5 to 4.0 |
| LOI | 27.0 to 30.0 |

The process for the preparation of the angular abrasive proppant of the present invention comprises the steps of drying, grinding, pelletizing and sintering a bauxite starting material, followed by the step of grinding the sintered pellets and sizing the resulting particles to a particle size in the range of from 40 to 120 mesh.

After the bauxite raw material undergoes a drying process, it is preferably ground into particles smaller than 45 μm. The steps of drying and grinding the bauxite starting material can be carried out by any method conventionally known for this purpose.

The particles of the ground and dried material are submitted to a sintering treatment and subsequently to a pelletizing step, with the addition of water and the optional use of pelletizing additives. The resulting sintered pellets are spherically or ovally shaped. In this step pelletizing aims only promotion of shaping the fine bauxite powder, and the final shape does not restrict the process, which can be any other than pelletizing, such as, for example, extrusion. The term sintering as used herein, refers to a thermal treatment defined by a calcination at high temperatures of from 1200° C. to 1600° C. This sintering temperature is the one at which the material completes its chemical reactions, the pores are practically eliminated and the material approaches to its melting or softening point. Specifically, the sintering temperature to be used is a function of the quality of the raw material used, of the volume feed into the sintering furnace, of the residence (permanence) time at that temperature and of the higher or lower susceptibility of the material to the sintering treatment.

After the sintering and pelletizing steps, the spherical pellets produced are then fragmented in suitable grinding devices to produce and size particles from 40 to 120 mesh. Said devices comprise mills which can be of several different types. Rod mills, as well as high speed rotor mills, are preferably used, since they are the only ones which enable high-yield adjustments of the desired range, 40/120, to be made with a minimum amount of fine particles generated. The average yield in these mills for each of the ranges indicated below is as follows:

|  | ROD | ROTOR |
|---|---|---|
| 40/120 | 22% | 10% |
| >40 | 74% | 85% |
| <120 | 4% | 5% |

For example, a rod mill was used in the studies of the present invention ground 1635 kg/hour of Spherical Sintered Bauxite in the 16 MF range (90% of the particles going through a 16 mesh screen), and presented, after sieving, the particle size distributions indicated above. This type of mill should be used for small volumes.

In another experiment, in which a Barmac rotor mill was used, 60 tons/hour of the same Spherical Sintered Bauxite were ground in the 16 MF range used above, and the particle size distributions indicated above were obtained after sieving. This type of mill should be used for the production of large volumes, as shown below:

Rod Mill=1.6 ton/hour yield

Rotor Mill=60 ton/hour yield.

Other mills can be used according to the present invention, but they generate amounts below 10% of particles in the 40/120 size range (the desired range to be produced) and amounts often above 15% of particles in the size range <120 mesh (commonly presenting amounts above 50%). This size range is undesirable, as it is too small and not currently useful for any specific market, and is thus classified as rejects. Particles >40 mesh would have reworked only by reground and sizing, without physical loss of material wherein just the cost of such rework is included.

With the adjustment technique developed accordingly to the process of the present invention, both the rod and the rotor types mills achieved a remarkable operability, which did not exist in the prior art. It should be further taken into account that the levels of wear-related maintenance of said mills are controlled and also very low.

The preferred, non limiting chemical and physical characteristics of the angular abrasive proppant according to the present invention are indicated in Tables 1, 2 and 3 below.

TABLE 1

Chemical characteristics of the angular abrasive proppant of the present invention:

| Oxide | Mass (%) |
|---|---|
| Al2O3 | 75.5 |
| Fe2O3 | 14.5 |
| SiO2 | 3.65 |
| TiO2 | 1.67 |
| Free Silica | Does not contain any |
| Mineralogical Composition | Corundum |
| DRX | Mullite |
|  | Hematite |

TABLE 2

Physical characteristics of the angular abrasive proppant of the present invention:

PARTICLE SIZE ANALYSIS - 40/120

| Sieves, Mesh | Retained mass (%) |
|---|---|
| #30 | 0.00 |
| #40 | 0.03 |
| #50 | 38.9 |
| #70 | 38.5 |
| #80 | 9.16 |
| #120 | 9.58 |
| Fine particles | 3.92 |

TYPICAL PHYSICAL CHARACTERISTICS

| Apparent density, g/cm | 3.71 |
|---|---|
| Loose density, g/cm$^3$ | 1.89 |
| Bulk density, g/cm$^3$ | 1.72 |
| Sphericity and roundness | 0.79 × 0.54 |

As aforementioned, sintered pellets loaded into the milling device can be mixed with the coarser angular particles remaining after the cycle of the process of the present invention, namely particles bigger than 40 mesh, which can be returned to the beginning of the milling step to be ground again. Moreover, the pellet load fed into the grinding device may also contain coarser angular particles, for example, bigger than 8 mesh, resulting from the process of production of spherical ceramic proppants or simply from the choice to change the process by generating coarser sintered bauxite. Until today, these coarse angular particles were considered to be manufacture rejects, since they had no use as spherical proppants.

An interesting and preferred characteristic of the angular abrasive product resulting from the present invention is its density, whose value is obtained from the measurement of the bulk density, which represents the mass of abrasive material which occupies a volume including the particles, the porosity of the particles and the empty spaces not occupied by the particles. A high-density angular abrasive proppant with a particle size in the range of 40/120, for example, should have a loose density in the range of from 1.80 to 2.00 g/cm3.

The sintered bauxite material of the present invention is a product formed by homogenous abrasive particles of high-density, high-mechanical strength, high-abrasiveness, high-hardness and high-toughness sintered bauxite.

The angular abrasive proppant of the present invention has enhanced and advantageous characteristics for a series of applications, in addition to those as a proppant for hydraulic fracturing and others previously indicated.

One of the applications consists of grinding or polishing the orifices of the tubes used as casing in oil and gas wells. The metallic tubes through which the fracturing process begins have several orifices along their length, by means of which the propagation of the fracture begins and through which the oil and gas flow. These orifices are ground before going into the formation adjacent to the wellbore where the fracturing begins by pumping abrasive proppant along with fluids, at extremely high speeds, by which means the proppant acts on the abrasion of said orifices when it passes through them. The fact that duly ground orifices are obtained enables the subsequent fracturing operation to be carried out at lower pressures. There may often be two tubes arranged parallel to one another to be drilled at the same time. In the processes known in the prior art, natural sand is used as the abrasive proppant in question, usually with a particle size of 100 mesh. However, in many cases the sand cannot completely penetrate these tubes due to its low mechanical strength and low relative abrasiveness, and consequently these zones may be completely abandoned and lost if their exploitation is no longer considered to be economically viable.

The angular abrasive proppant of the present invention provides a solution to this problem by enabling said abandoned and supposedly lost zones to become productive zones again, and at the same time, new zones can be fractured using this methodology. The inventors of the present application also concluded that, in addition to the operational advantage of grinding the orifices, the particles of the angular abrasive proppant of the present invention also penetrate the tubes more effectively and penetrate the adjacent rock formations more deeply, thus ensuring a better start for the primary fracture.

Another application for which the angular proppant of the present invention is particularly suitable is the hydraulic fracturing in "unconventional" gas wells, in which the fracturing techniques known in the prior art cannot be used. Most fracturing treatments in these wells are carried out in weak, unconsolidated formations. This is why the treatments used for these regions combine the effects of fracture stimulation and packing, and therefore are known as "Frac-Pack". The commercial interest in these wells has grown considerably in the last years, and consequently the need to search for suitable materials to be used in their operation has also grown.

In unconventional wells, microfractures are also formed in addition to the fractures obtained hydraulically. In order to eliminate or reduce the loss of the fluid used during the fracturing operation and at the same time increase the effectiveness of said fluid, the processes known in the prior art provide for the filling of said microfractures with relatively small volumes of natural sand with a particle size of 100 mesh, or by using a high-resistance spherical ceramic proppant or an medium-resistance spherical ceramic proppant.

As already mentioned above, the use of sand increases the problem of proppant flow back, since the sand is crushed and pulverized due to is low resistance to high pressures. The spherical ceramic proppants are intrinsically less abrasive than the angular ceramic proppants, and at the same time the production of spherical ceramic proppants of under 40 mesh is limited. Consequently, spherical ceramic proppants of the 30/50, 30/60, 35/70 types are available in the prior art only in very small amounts when compared to the angular abrasive proppant of the present invention, which would have almost no limit as to the amount to be manufactured.

The use of the abrasive particles of the proppant of the present invention has shown excellent results as a substitute for the use of the products conventionally used for this purpose. Moreover, the mechanical strength of the proppant of the present invention is superior to that of natural sand. For example, even when said proppant breaks as a result of the action of these forces, the resulting particles will be bigger (coarser) than the natural sand particles and will not be fractured, pulverized and reduced to very fine particles, like dust, as happens with natural sand, which are formed mainly by quartz. Therefore, as a result of the use of the angular abrasive proppant of the present invention, fine particles are not generated, and consequently a higher microfracture conductivity is ensured.

A third application for which the proppant of the present invention is especially suitable is water fracturing, which comprises using ungelled water with fracturing fluid. The process consists of pumping large volumes of water (around 4.000 m3) with low concentrations of proppants (from zero to 100 kg/m3, with an average of about 10 kg/cm3). The proppants have very small particle sizes. This technology is applicable only in low-permeability gas wells, in which very low fracture conductivities can be tolerated.

These stimulations with water and proppants with small fine particle sizes, known as "water-fracs", are effective due to several superior characteristics when compared to the fracturing with gelled fluids. For example, they are more economical, enhance the natural conductivity of the fracture with the central tubing, fracturing make obtention and treatment much easier when compared to the conventional treatment, among other advantages. Since the so-called "water-fracs" do not usually generate very wide fractures, proppants with very small particle sizes are preferable. The proppant traditionally used in this case is natural sand with a particle size of 100 mesh, although proppants having higher mechanical strength are more effective, and consequently desirable. However, no proppants having a mechanical strength superior to that of natural sand and suitable for this use are available in the prior art. The proppants of the present invention have proven to be suitable for this purpose since, due to their abrasiveness, they introduce to the process an effective means of providing some level of grinding of the fractured surfaces of the formation, thus reducing or even eliminating the roughness thereof. Thus, the fracture obtained does not completely close as a result of the action of the confinement pressure, which provides some conductivity without the need to use other conventional proppants.

The example below illustrates better the angular abrasive proppant described in the present application and the process for the production thereof. It should be noted, however, that the parameters described in the example should not be considered to limit the scope of the present invention.

EXAMPLE

Raw bauxite washed with the chemical composition of the table below, was used as starting material:

| WASHED BAUXITE | |
|---|---|
| Oxide | Content (%) |
| $Al_2O_3$ | 54.2 |
| $Fe_2O_3$ | 10.4 |
| $TiO_2$ | 2.62 |
| $SiO_2$ | 1.20 |
| I.L. | 28.2 |
| Humidity | 17.0 |

The raw material was dried in a rotating dryer and the dried bauxite was ground in a five-roll Raymond mill, to obtain the dried powder bauxite with the following particle sizes:

TABLE III

PARTICLE SIZE ANALYSIS - MICROMERITICS SEDIGRAPH DRIED GROUND BAUXITE

| Diameter (micra) | Cumulative Content (%) Finer than the Diameter |
|---|---|
| 40 | 96.0 |
| 30 | 90.0 |
| 25 | 83.4 |
| 20 | 71.8 |
| 15 | 50.2 |
| 10 | 23.4 |
| 8 | 12.3 |
| 6 | 8.0 |

The particle size test was carried out in a Micromeritics Sedigraph 5100 V2.03 X-ray analyzer.

The pellets were formed by using an R-18 Eirich mixter/pelletizer, with capacity for 3000 kg of mixture. With the Eirich mixer in operation and with the appropriate tool to obtain the required size of pellets off, 800 kg of dried bauxite and, immediately afterwards, drinking water were added. The pelletizing tool was then immediately turned on and kept in operation for 10 minutes. After this period, the lower lid of the Eirich mixer was opened and the pellets obtained, having a water content of 22% to 25%, were poured onto conveyor belts which fed a Rotating Calcinator System, comprising a drier, a calcinator and a cooler, all rotatable, operating at a maximum temperature of 1600° C. The total pellet yield was of about 1000 kg, with a particle size range of ¼" and below.

The resulting sintered pellets were loaded into a rod mill (containing ⅔ of its volume filled with rods) or into a rotor mill. In the case of the rod mill, the pellets were fed transversally through the center of the mill and unloaded through the side exits, near the axis. Constant feeding was carried out so as to keep the internal volume of the mill always filled with the pellets to be ground.

After the grinding and sizing by sieving, 22% of the particles obtained were in the range of 40/120, 5% were fine particles smaller than 120 mesh and 74% were coarser particles (above 40 mesh), which were returned to the mill to be ground again.

The particles in the range of 40/120 had a bulk density of 1.72 g/cm.

In the case of the rotor mill, the pellets were fed into the mill through the center, top part, and unloaded through the bottom. Constant feeding was carried out so as to keep the internal volume of the mill always filled with the pellets to be ground.

After the grinding and sizing by sieving, 10% of the particles obtained were in the range of 40/120, 5% were fine particles smaller than 120 mesh and 85% were coarser particles (above 40 mesh), which were returned to the mill to be ground again.

The particles in the range of 40/120 had a bulk density of 1.72 g/cm.

The invention claimed is:

1. Process for hydraulic fracturing of oil and gas wells, said process consisting of using an angular abrasive proppant consisting of angular sintered-then-ground particles of a material selected from the group consisting of bauxite, clay-minerals, and mixtures thereof, the angular abrasive proppant consisting entirely of angular sintered particles of said material produced by grinding and sieving sintered particles of said material, and wherein particle sizes of said angular particles are within a range from 30 mesh to 150 mesh.

2. Process according to claim 1, wherein the oil and gas wells are non-conventional wells.

3. Process according to claim 1, wherein said hydraulic fracturing process is hydraulic water fracturing.

4. Process according to claim 1, wherein the using of the angular abrasive proppant involves using the angular abrasive proppant to grind metallic tubes employed for said process for hydraulic fracturing.

5. Process according to claim 1, wherein said angular sintered particles are prepared by a process in which said material selected from the group consisting of bauxite, clay-minerals, and mixtures thereof is first dried and then ground into particles, followed by sintering said particles and then pelleting said sintered particles, and finally grinding said pelletized sintered particles into angular sintered particles and sizing said angular sintered particles to have particle sizes within said range from 30 mesh to 150 mesh.

* * * * *